Figure 1:
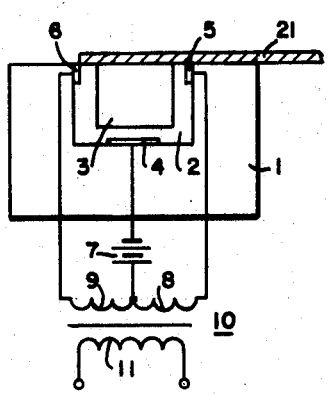

Dec. 29, 1964  F. KUHRT ETAL  3,163,721

TRANSDUCER FOR MAGNETIC RECORDINGS

Filed June 23, 1960

United States Patent Office 3,163,721
Patented Dec. 29, 1964

3,163,721
TRANSDUCER FOR MAGNETIC RECORDINGS
Friedrich Kuhrt and Gustav Stark, Nurnberg, Germany, assignors to Siemens-Schuckertwerke Aktiengesellschaft, Erlangen, Germany, a corporation of Germany
Filed June 23, 1960, Ser. No. 38,150
Claims priority, application Germany, July 2, 1959, S 63,723
2 Claims. (Cl. 179—100.2)

Our invention relates to a transducer for sensing and reproducing magnetically recorded signals, for example from a recording tape or other magnetogram carrier which is movable relative to the transducer. In a more particular aspect, our invention relates to transducers in which the signal-responsive sensing member proper consists of a magnetically controllable semiconductor body in which current or voltage variations are produced in dependence upon the magnetic recordings being sensed.

The known transducers of this type are designed as Hall voltage generators and have a semiconducting Hall plate or wafer located in the field gap of a magnetizable core structure, the gap being adjacent to the magnetogram carrier travelling past the gap. It has been proposed to mount the Hall plate at such a location in the gap that the plate is immediately adjacent to the magnetogram carrier during operation of the transducer. This is desirable because a close or direct magnetically active contact of the sensing member with the magnetogram would secure maximum sensitivity of the transducer. With Hall-voltage generators, however, such a direct contact is difficult to obtain because one of the Hall-voltage electrodes of the Hall plate must be mounted on the front edge of the Hall plate facing the magnetogram carrier. Consequently some spacing between the electrode-carrying edge and the magnetogram carrier has heretofore been indispensible for accommodating the electrode as well as the electric lead connected thereto. For that reason, past efforts toward providing a narrowest possible field gap have either failed to permit mounting the Hall plate as close to the active front of the transducer head as is desirable for best sensitivity, or have required special expedients of accommodating the electrode lead to make it extend to the front edge of the Hall plate without necessitating an appreciable spacing between that edge and the magnetogram carrier, but these expedients result in a more complicated and more costly design of the Hall-voltage transducer than desirable.

It is an object of our invention to obviate the above-mentioned shortcomings and difficulties.

To this end, and in accordance with a feature of our invention, we provide a magneto-restrictive transducer of the general type mentioned, with a magnetically controllable semiconductor plate in which the Hall effect is not directly employed for obtaining a varying Hall-voltage output, but in which the Hall effect is indirectly utilized for varying the current distribution between two differentially interrelated circuits.

According to a prior proposal a mutually inverse control of two load devices can be obtained by using a magnetic-field responsive resistor with a center-tap electrode and two terminal electrodes spaced from the central electrode at opposite sides thereof. The resistor is subjected to a magnetic field which controls the distribution of the current flowing from the central electrode to the respective terminal electrodes.

According to our invention, we utilize this principle of current distribution by providing a thin and preferably rectangular plate, wafer or coating, with three electrodes and three corresponding electrode leads, none of which is located at the plate edge facing the path of the magnetogram carrier along the transducer head. One of the three electrodes and appertaining leads is disposed on the semiconductor plate at the edge opposite the one facing the magnetogram carrier, whereas the other two electrodes and leads are located at the remaining two lateral edges of the plate or are indirectly correlated or connected to these edges. This affords placing the active zone of the transducer head and the sensing member in direct or substantially direct contact with the magnetogram carrier.

Figure 2:
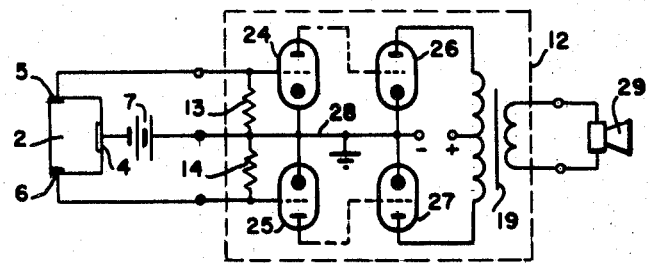
Figure 3:
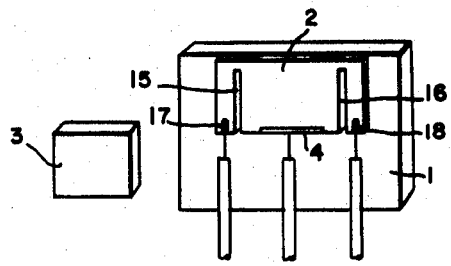
Figure 4:
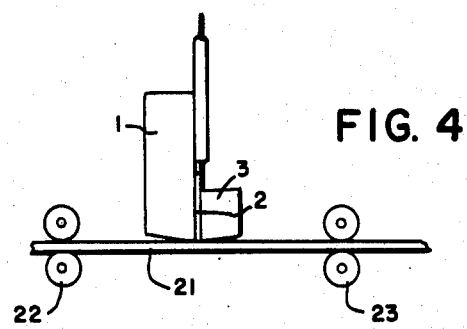

The foregoing and more specific features of our invention will be further described below with reference to the embodiments of transducers according to the invention illustrated by way of example in the accompanying drawing, wherein FIG. 1 is a front view, in enlarged scale, of an embodiment of a transducer device of the present invention and also shows a schematic circuit diagram of appertaining circuitry;

FIG. 2 is a front view, in enlarged scale, of an embodiment of a transducer according to the invention together with another embodiment of the appertaining circuitry;

FIG. 3 is a schematic perspective view, in enlarged scale, of another embodiment of a transducer head of the present invention, the two components of the ferromagnetic core system shown separated from each other; and FIG. 4 is a lateral view, in enlarged scale, of a transducer of any of the preceding figures, in conjunction with a magnetogram carrier travelling in proper sensing relation to the transducer head.

The illustrated transducers comprise a transducer head with a base plate 1 of magnetizable high-permeability material, preferably ferrite. Mounted on the base plate 1 is a magnetically controllable semiconductor body 2 consisting of a thin plate, wafer or coating deposited upon the plate 1. The semiconductor body, hereinafter referred to as "semiconductor plate" or "wafer," may consist of any elemental or compound material suitable for Hall-voltage generating purposes but is preferably made of indium arsenide (InAs), indium antimonide (InSb) or another compound of the type known as $A^{III}B^V$ semiconductor compounds from U.S. Patent 2,798,989 of H. Welker, assigned to the assignee of the present invention.

A second magnetizable plate, preferably also of ferrite, corresponding in shape and dimensions to the base plate 1, may be placed upon the semiconductor wafer so that the wafer is located in a narrow field gap between the two ferrite plates. However it suffices, as shown in FIGS. 1, 3 and 4, to mount a ferrite plate or bridge piece 3 of smaller dimensions than the plate 1 on the opposite side of the wafer 2, the two ferrite plates being firmly joined with each other by cementing or other non-magnetic fastening means or by mounting or embedding both in an insulating housing or casing of plastic (not shown).

The semiconductor wafer 2 of InSb or InAs has a size of 2 x 5 mm. and is 5 microns thick. It is provided with three metal electrodes 4, 5 and 6 to provide for the above-mentioned current-distribution control in dependence upon the magnetic signal fields acting upon the wafer.

According to FIG. 1 a voltage source 7, for example of 2 to 3 volts, drives a current of about 50 milliamps through the common center-tap electrode 4 and through the semiconductor wafer 2 to the two terminal electrodes 5 and 6. When no magnetic field is active, either because no magnetogram carrier is close to the transducer head or because any carrier engaging the head does not carry a magnetic signal at the point of contact with the head, the current from source 7 is divided into two substantially equal amounts so that the two half portions 8 and 9 of the primary winding in a transformer 10 are traversed by currents of the same magnitude but opposite direction of flow. Depending upon the magnitude and direction of the magnetic field passing through the semiconductor wafer, the current flow within the wafer becomes displaced so that a greater or major portion of the current flow passes from the center electrode 4 either to the terminal electrode 5 or to the electrode 6. The secondary winding 11 of transformer 10 then furnishes transducer output voltages corresponding to the magnetic signal recorded on the magnetogram carrier.

During operation, the magnetogram carrier, such as magnetic recording tape 21, is caused to travel along suitable guide means, here exemplified by two pairs of guide rollers 22, 23, past the field gap of the transducer head and preferably in direct contact with the ferrite plates 1, 3 and with the adjacent electrode-free edge of the semi-conductor wafer (FIG. 4).

When using a direct-current source 7 of constant voltage, the above-described transducer will respond to the change in signal flux caused by the travel of the signal carrier along the transducer head. However, the source 7 may also supply alternating voltage. This is preferable, for example, when the transducer is to be used for static sensing, namely under conditions where the magnetogram carrier is at standstill, or travels step-wise or at very slow speed. If desired, the frequency of such an alternating voltage source may serve as a carrier frequency which is higher than the frequency range to be responded to, so that the transducer output voltage constitutes a signal-modulated carrier frequency. For example when reproducing tone frequencies, the frequency of the source can be chosen to be in the ultrasonic or high-frequency range.

The embodiment of FIG. 2 is provided with a transducer head corresponding to the one described above, although only the semiconductor wafer 2 is illustrated. The electrodes 4, 5, 6 of the wafer are directly connected to a push-pull amplifier 12 for directly controlling the amplifier by the varying current distribution in the semiconductor wafer. In the embodiment of FIG. 2, the amplifier 12 is a multi-stage electronic-tube amplifier for tone-frequency voltages; only the tubes 24, 25 of the input stage and the tubes 26, 27 of the power output stage being illustrated. The tubes have a common cathode lead 28, preferably grounded, which is connected to one pole of the voltage source 7 whose other pole is connected to the electrode 4. The electrodes 5 and 6 are directly connected to the respective control-grid circuits of tubes 24 and 25 to impress control potentials thereupon with the aid of voltage-drop or coupling resistors 13 and 14 respectively, although it will be understood that an inductive or capacitive coupling may also be used. The plate voltages of tubes 26 and 27 are applied to the two halves of the primary in a transformer 19, the mid-point of the primary being connected to the source of plate voltage whose other pole is connected to the common cathode lead 28. A loudspeaker 29 is shown connected to the secondary of transformer 19. In lieu of an electronic tube amplifier, a transistor amplifier may be used and may likewise be directly coupled with the electrodes of the semiconductor plate. A signal-input transformer need not be used since the semiconductor wafer can furnish input currents in the order of milliamps, so that no voltage pre-amplification is required.

Such a transistor device is particularly advantageous for portable small and light-weight reproducers which are energized by low-voltage sources, such as batteries, independently of a utility power supply line, and in which a sound reproduction of high quality is to be obtained.

Shown in FIG. 3 is a particularly favorable modification relating to the connection of the two counter electrodes with the semiconductor wafer. The wafer is provided with slits 15 and 16 which extend from the rear edge of electrode 4 toward the electrode-free front edge in parallel relation to, and near the two lateral edges of the wafer. The terminal electrodes 17 and 18, like the center electrode 4, are located at the rear edge of the wafer but are separated from electrode 4 by the respective slits 15 and 16. This permits locating all three electrode leads on the rear side of the semiconductor wafer so that they all extend away from the rear edge. The narrow strips formed by the slits 15 and 16 serve as conductors which connect the respective electrodes 17 and 18 with the active, central portion of the wafer 2. The slits can be produced by chemical etching, cutting, or any other suitable expedient. The connecting wires are attached to the electrodes by soldering. The slitting, which can be effected with extreme precision, further permits the provision of an essentially induction-free circuit connection which is of particular advantage particularly for devices serving sensitive measuring purposes.

Transducers according to the invention are applicable for sensing and reproducing magnetic recordings on tapes, discs, foils and other magnetogram carriers, including magnetized wires or other bodies which, during sensing operation move relative to the transducer. Thus, the invention is applicable, for example, to magnet-tone devices in which acoustic oscillations are to be reproduced with a high-quality frequency characteristic. Transducers according to the invention are also applicable for measuring, control and regulating purposes in many fields of technology, particularly in cases where very slow variations of the magnetic induction are encountered. Such conditions obtain, for example, where the magnetic signals are indicative of measuring values and where not only the temporal variation of the magnetic induction are to be responded to, but where it is mainly or additionally necessary to respond to the absolute value of the magnetic induction itself. The invention is further applicable for control-engineering purposes, for example the control of machine tools and other fabricating machinery by commands or program data which are recorded as magnetic signals on a magnetogram carrier, particularly in cases where a motion of the magnetogram carrier relative to the transducer head occurs at varying speed or incrementally, and where a transmission of the recorded command must also be possible when the magnetogram carrier is at standstill.

We claim:

1. A transducer device for reproducing magnetic signals from magnetogram carriers movable relative to the transducer device, comprising a magnetizable core structure having a portion adapted for engagement by the magnetogram carrier and having in said portion a substantially planar field gap with a gap edge extending up to the place of carrier engagement, a substantially rectangular semiconductor plate disposed in said gap so as to be subjected to magnetic field variations due to the signals to be reproduced, said plate having an electrode-free edge substantially flush with the carrier-adjacent edge of said gap, three mutually spaced electrodes joined with said plate at locations away from said edge, one of said electrodes being located centrally on the plate edge opposite said electrode-free edge, said plate having two slits extending from said opposite plate edge to near said electrode-free edge, said two slits being spaced from said one electrode on opposite sides thereof, said other two electrodes being located at places separated by said respective slits from said one electrode, and an electric sensing circuit having three leads connected to said respective electrodes.

2. In a transducer device according to claim 1, all three of said electrodes being located on said opposite plate edge, and said three leads extending away from said latter edge at a substantially right angle thereto and substantially in the plane of said plate.

References Cited in the file of this patent

UNITED STATES PATENTS

| | | |
|---|---|---|
| 2,736,822 | Dunlap | Feb. 28, 1956 |
| 2,866,013 | Reis | Dec. 23, 1958 |
| 2,900,451 | Havstad | Aug. 18, 1959 |
| 2,978,545 | Howling | Apr. 4, 1961 |